United States Patent [19]

Suzuki et al.

[11] Patent Number: 5,504,862
[45] Date of Patent: Apr. 2, 1996

[54] LOGIC VERIFICATION METHOD

[75] Inventors: Kaoru Suzuki, Fujisawa; Keisuke Osakabe, Zama, both of Japan

[73] Assignee: Hitachi, Ltd., Tokyo, Japan

[21] Appl. No.: 215,380

[22] Filed: Mar. 21, 1994

[30] Foreign Application Priority Data

Mar. 26, 1993 [JP] Japan .................................... 5-067966

[51] Int. Cl.$^6$ .................................................. G06F 11/00
[52] U.S. Cl. ........................................................ 395/183.09
[58] Field of Search ............................. 371/22.1, 23, 24; 395/575, 183.08, 183.09; 364/578; 346/488; 365/201

[56] References Cited

U.S. PATENT DOCUMENTS

| | | | |
|---|---|---|---|
| 4,551,837 | 11/1985 | Goegeiein et al. | 371/25 |
| 4,937,770 | 6/1990 | Samuels et al. | 364/578 |
| 5,051,938 | 9/1991 | Hyduke | 364/578 |
| 5,095,454 | 3/1992 | Huang | 364/578 |
| 5,202,889 | 4/1993 | Aharon et al. | 371/27 |
| 5,377,122 | 12/1994 | Werner et al. | 364/488 |

FOREIGN PATENT DOCUMENTS 4-291460  10/1992  Japan .

*Primary Examiner*—Robert W. Beausoliel, Jr.
*Assistant Examiner*—Norman M. Wright
*Attorney, Agent, or Firm*—Fay, Sharpe, Beall, Fagan, Minnich & McKee

[57] ABSTRACT

A logic verification method for simulating a logic circuit model by using the instruction interpreter, connected to the first and second files, for executing an executable program, includes the steps of: outputting to the second file first status information after the executable program loaded from the first file and already compiled has been executed to an inputted first location; outputting to the second file second status information after the executable program loaded from the first file has been executed to an inputted second location in the instruction interpreter; setting the first status information to the memory unit of the logic circuit model; and outputting to the display, together with the second status information, third status information after the executable program has been executed from the fist location to the second location in the logic circuit model. The first and second locations are assigned by the operator to save the executable program and set an interruption instruction. When a simulation error has occurred, it is possible to alter the first status information and make the executable program to execute and the other portion of the executable program to execute without recompiling.

14 Claims, 4 Drawing Sheets

LOGIC VERIFICATION METHOD

CROSS-REFERENCE TO RELATED APPLICATIONS

The present invention relates to a patent application Ser. No. 07/854,394 filed on Mar. 19, 1992 by Y. Onodera et al. under the title of LOGICAL CIRCUIT SIMULATION SYSTEM and a patent application Ser. No. 08/034,235 filed on Mar. 22, 1993 by K. Suzuki under the title of LOGIC VERIFICATION METHOD AND SYSTEM.

BACKGROUND OF THE INVENTION

The present invention relates to a logic verification apparatus, and relates more particularly to a technique which is effective when it is applied to a logic verification technique in a desired section of a desired program.

The U.S. Pat. No. 4,937,770 issued to Samuels et al. discloses a simulation system.

In a conventional logic verification apparatus, a test program is executed and a logic verification is carried out after carrying out an alteration. Elusive DIAG (diagnosis) instructions are included in a source code of the test program which includes an initializing unit for setting an initial value and an expected value for the simulation, a testing unit for testing the simulator, and a result decision unit for providing a decision after comparing a result of the execution of the testing unit and the expected value. In the application of this test program, when one of the DIAG instructions has been detected during a period when an architecture simulator or an instruction interpreter for simulating an operation equivalent to the logic circuit model to be tested executes the initializing unit in a data transfer level, the status of an information group relating to the logic circuit structure at this time is registered in the file as an initial value, and when another DIAG instruction has been detected after executing the testing unit, the status of the logic circuit structure information at this time is registered in the file as an expected value. Then, after the initial value has been set in the logic circuit model, the circuit model executes the testing unit and the result of the execution is compared with the expected value and a decision is made. Thus, the logic verification is completed.

Regarding a logic verification for sequentially calculating output signal values of whole basic logic elements in a gate level within the circuit model, a method for achieving this logic verification by executing only a fixed test instruction sequence, that is a part of the test program, on the circuit model is disclosed in JP-A-4-291460 which corresponds to the Japanese patent application Ser. No. 07/854,394 filed on Mar. 19, 1992 by Y. Onodera et al.

In this logic verification, during an execution of a test program, for example, logic quality or a logic verification environment at the time when an interruption instruction has been detected applies a limit on the execution to the program to be executed in the circuit model. In this case, it is necessary to select and execute a portion which can be executed by the program based on the logic quality and the logic verification environment at this location. In other words, according to the prior art technique, there is a problem that it is necessary to build in advance exclusive DIAG instructions in the source program to be executed, or it is necessary to alter the program source code. There is also a problem that the logic verification cannot be applied if the source code of a benchmark program or an application program has not been changed.

SUMMARY OF THE INVENTION

It is an object of the present invention to provide a logic verification method and a logic verification apparatus which make it possible, by executing a desired section of a desired program in a data processing unit or a logic circuit model, to efficiently carry out a wide range of logic verification in higher precision that is not restricted by an execution environment.

It is another object of the present invention to provide a method and an apparatus for executing logic verification in a data processing unit to be tested or in a logic circuit model to be tested by rewriting data at the portion where an error occurs in a desired program.

The above and other objects and novel characteristics of the present invention will be apparent from the description of the present specification and attached drawings.

The outline of the typical characteristics of the present invention disclosed in the present application will be briefly explained as follows.

The logic verification method of the present invention is a logic verification method which uses a logic circuit model to be achieved by basic logic elements of the gate level or circuit equipment equivalent to this logic circuit model. This logic verification method includes a step for registering in the file a group of logic circuit structure information or a group of execution status data at desired locations in a desired program to be executed in an instruction interpreter for simulating an operation equivalent to the logic circuit model or the circuit simulator in a data transfer level, a step for setting a value of the group of logic circuit structure information into the memory of the data processing unit to be tested or the logic circuit model to be tested in order to use this value as an initial value at a desired location at the time of executing a program and as an expected value when the program has been executed to a desired location, a step for starting a program, detecting an interruption at this location and registering logic circuit structure information in the file, a step for recovering a saved instruction and restarting a program, and a step for making a decision whether the result of a simulation is correct or not by comparing the result with the expected value within the logic circuit structure information.

It is also possible to correct or alter a desired group of logic circuit structure information at the time of registering the logic circuit structure information in the file.

For the portion other than the instruction sequence for logic verification of the program, it is possible to carry out logic verification by using an exclusive logic simulator or an exclusive logic circuit.

Further, the logic verification apparatus of the present invention is a logic verification apparatus which uses a logic circuit model to be achieved by basic logic elements of the gate level or a circuit simulator equivalent to this logic circuit model. This logic verification apparatus includes a registering unit for registering in the file a group of logic circuit structure information or a group of execution status data at desired locations in a desired program to be executed in an instruction interpreter for simulating an operation equivalent to the logic circuit model or the circuit simulator in a data transfer level, an initializing unit for setting a value of the group of logic circuit structure information on the data processing unit to be tested or the logic circuit model to be tested as an initial value at a desired location when a program is executed, an expected value setting unit for setting the value of the group of logic circuit structure information as an expected value when a program has been executed to a desired location, and a decision unit for making a decision whether the result of a simulation is correct or not by executing only a desired section of a program on the data processing unit to be tested or the logic circuit model to be tested.

By correcting or altering desired logic circuit structure information by a correcting or altering unit at the time of registering information in the file, it is possible to execute portions of the desired program other than a portion of the program which does not operate correctly, on the data processing unit to be tested or the logic circuit model to be tested and carry out logic verification, without executing this abnormal portion.

For a portion other than the logic verification instruction of an execution program, it is possible to reduce the logic verification time by using an exclusive high-speed logic simulator or an exclusive logic circuit.

With the above arrangement, by executing a desired section of a desired program on the data processing unit to be tested or the logic circuit model to be tested, it is possible to efficiently carry out a wide range of logic verification, in higher precision than in the past without being restricted by an execution environment, and it is also possible to easily analyze a fault when it occurs.

BRIEF DESCRIPTION,.OF THE DRAWINGS

DESCRIPTION OF THE PREFERRED EMBODIMENT

Figure 1:
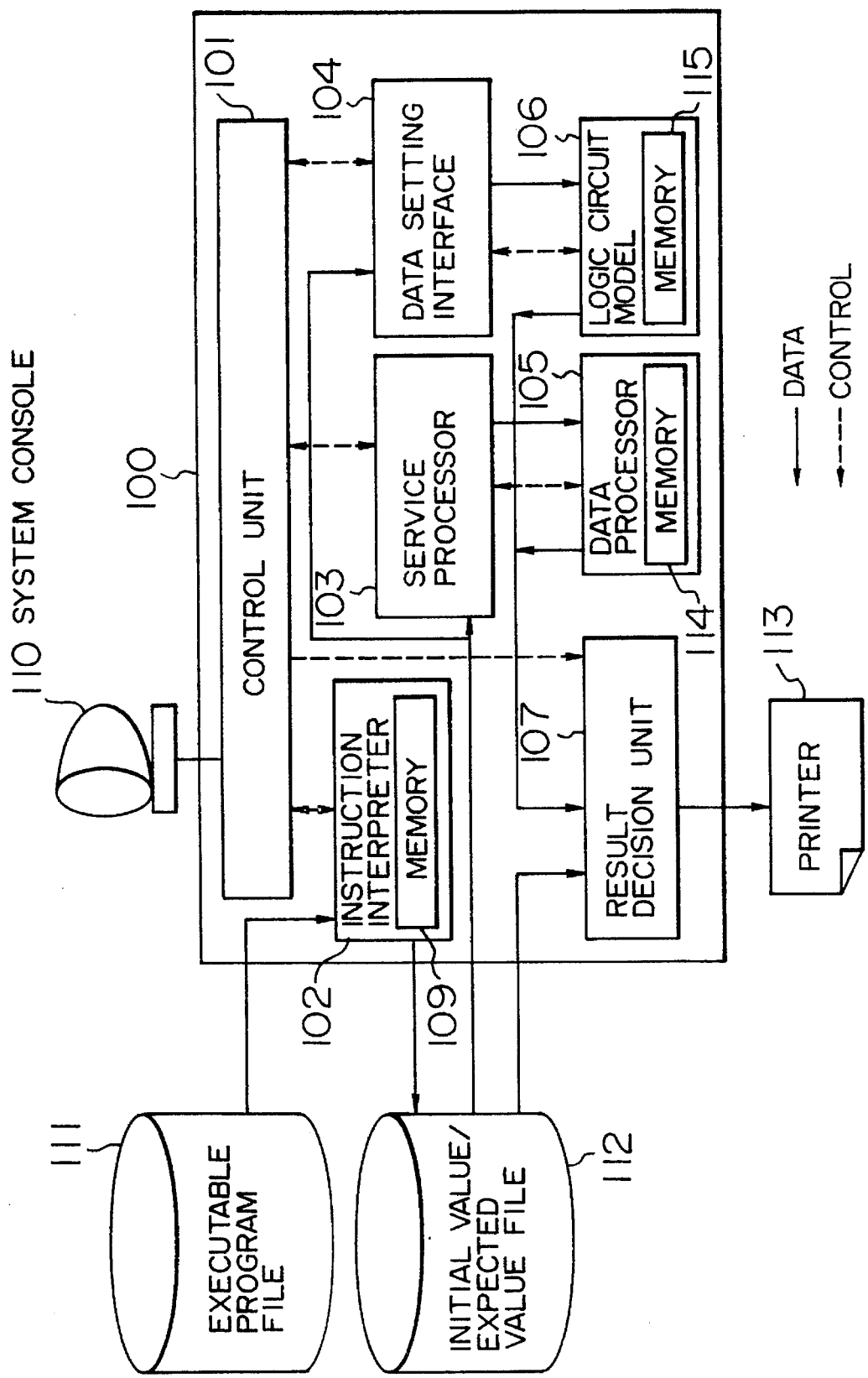
FIG. 1 is a block diagram for showing the structure of the logic verification apparatus in one embodiment of the present invention.

In a logic verification apparatus 100 shown in FIG. 1, logic verification is carried out by using a logic circuit model which includes a basic logic element such as, for example, a logic gate, or a circuit simulator corresponding to this model.

This logic verification apparatus 100 is structured by a control unit 101 for controlling the whole processing of the logic verification apparatus, an instruction interpreter (a registration unit, a correcting or altering unit) 102, a service processor (an initial value setting unit, an expected value setting unit) 103, a data setting interface (an initial value setting unit, an expected value setting unit) 104, a data processor 105, a logic circuit model 106, and a result decision unit 107. It is clear from the following explanation that logic verification can be carried out even if one pair does not exist out of the pair of the service processor 103 and the data processor 105 and the pair of the data setting interface 104 and the circuit model 106.

The service processor 103 carries out setting of the status within the data processing unit 105 to be tested or data within the register memory, and provides information service, and the data setting unit 104 carries out setting of the status of the logic circuit model (simulator) 106 and provides information service.

The result decision unit 107 compares the contents of the initial value/expected value file 112 with the result of the execution of the object program on the data processing unit 105 or the logic circuit model 106, and evaluates and outputs the result of the comparison.

The logic verification unit 100 is connected with a system console 110, an object program file 111 for storing executable programs, the initial value/expected value file 112 which has been outputted by the instruction interpreter 102, and a printer 113 for outputting a result of logic verification.

Figure 2:
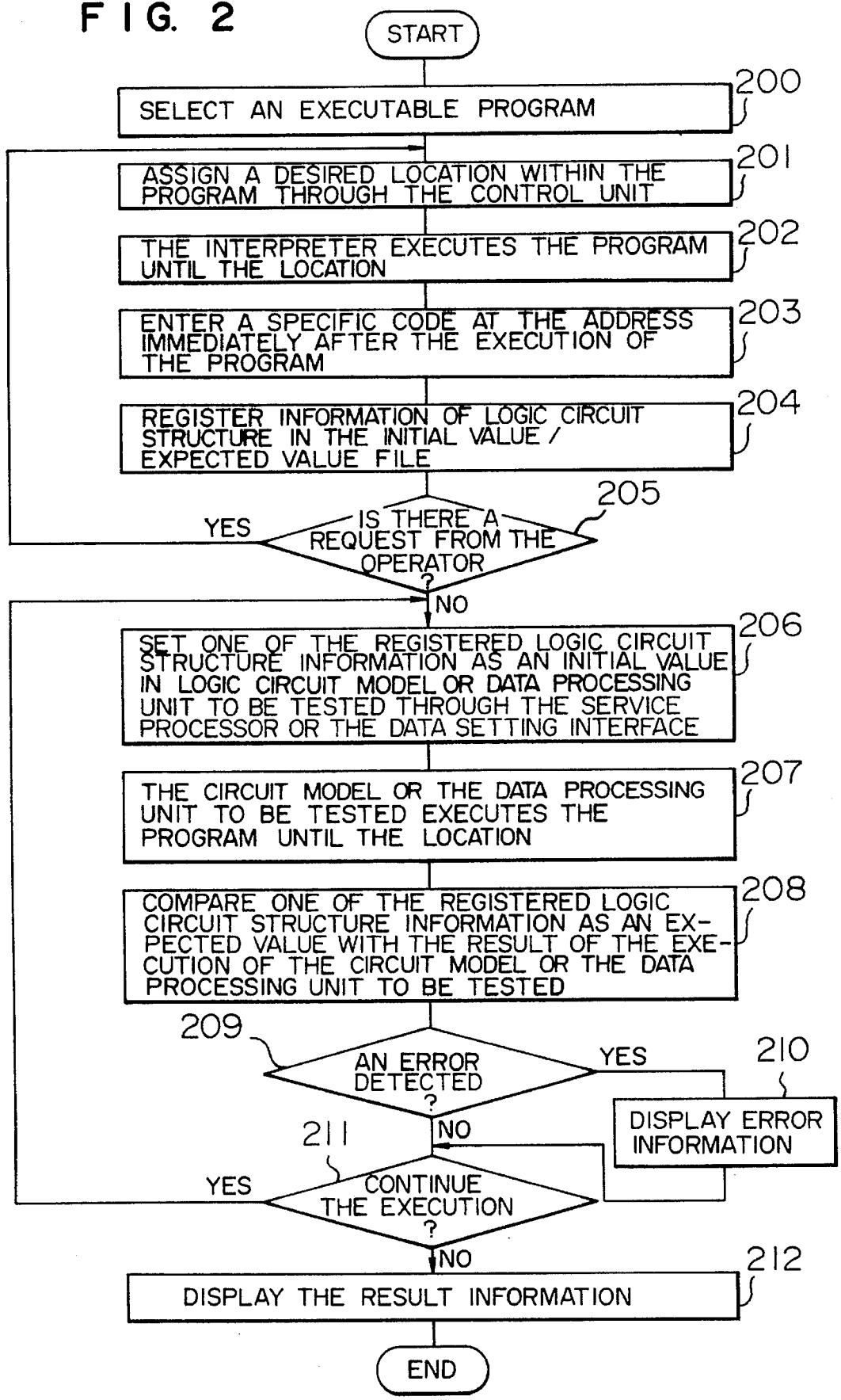
FIG. 2 is a flow chart for showing the whole control operation of the logic verification apparatus in the present embodiment.

The whole control operation of the logic verification apparatus 100 of the present embodiment will be explained with reference to FIG. 2. At step 200, the operator selects a desired object program from the executable program file 111 and loads the selected program in a memory 109 through the control unit 101. At step 201, the operator assigns a desired location within the selected program through the control unit 101. When the selected program is displayed in the system console, the source program is also displayed in parallel to assist the operator to select a program and a location or an instruction.

At step 202, the instruction interpreter 102 executes the program up to the location of where the address has been assigned through the control unit 101. At step 203, an instruction at the location immediately after the stopping of the execution within the program is saved and a specific code for a generation of an interruption is inserted. At step 204, the logic circuit structure information (see FIG. 4) currently held in the memory 109 within the instruction interpreter 102 is registered in the initial value/expected value file 112 of the object program.

At step 205, a decision is made whether the operator has requested an assignment of another desired location within the program or not. If the operator has made such a request, the above steps 201 to 204 are repeated and if no such request has been made, an initial value is set at step 206.

At the step 206, the operator sets one of the logic circuit structure information registered in the program initial value/expected value file 112 as an initial value in the memory of the data processing unit 105 to be tested or the circuit model 106, through the service processor 103 or the data setting unit 104. The selected executable program is loaded in a memory 114 within the processor 105 or in a memory 115 within the logic circuit model 106. At step 207, the data processing unit 105 or the model 106 executes this program and stops the execution when a specific code has been detected.

At step 208, the operator uses one of the other logic circuit structure information registered in the program initial value/expected value file 112, as an expected value of the result of the execution of the data processing unit 105 to be tested 105 or the logic circuit model 106 to be tested, and compares the result of the execution with this expected value for making a decision.

At step 209, a decision is made on a detection of an unmatched state or an error and if an unmatched state or an error has been detected by the decision after the comparison, error information is displayed at step 210. If no error has been detected, a decision is made at step 211 whether the execution should be continued or not.

At step 210, the result decision unit 107 outputs the error information to the system console 110 and the printer 113.

At step 211 for making a decision of whether the execution should be continued or not, if a decision has been made that the execution is to be continued, the step 206 for setting of an initial value of the data processing unit to be tested 105 or the logic circuit model to be tested 106 and the subsequent steps are repeated, and if a decision has been made that the execution is not to be continued, result information is outputted at step 212.

At the step 212, the result decision unit 107 outputs the result information to the system console 110 and the printer 113.

Through the steps as described above, the control operation by the logic verification apparatus is executed from the selection of a program by the operator to the outputting of the result information.

Figure 3:
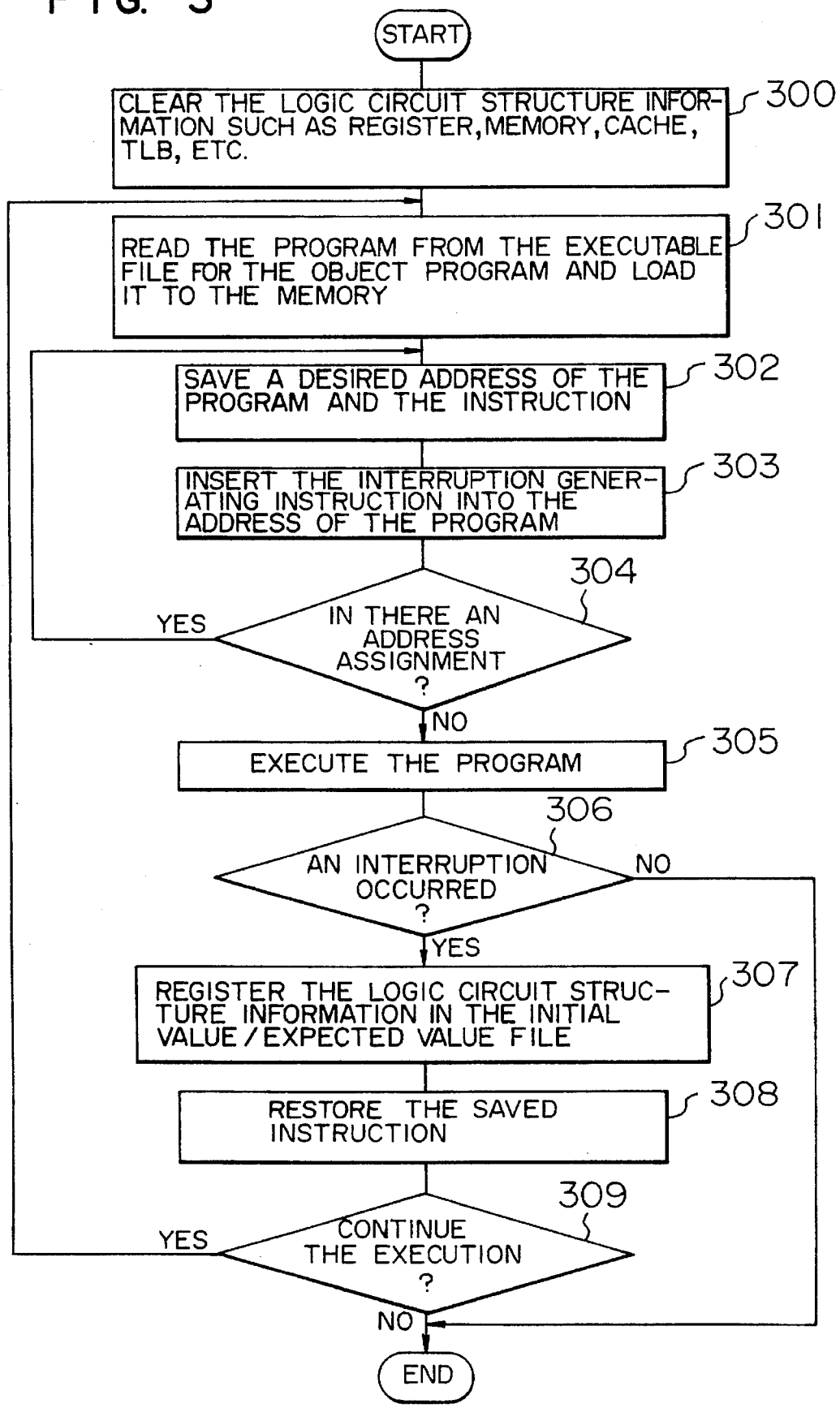
FIG. 3 is a flow chart for showing one example of the operation for outputting the logic circuit structure information to the initial value/expected value file of the object program in the present embodiment.

Next, the process up to the stage where the instruction interpreter 102 outputs logic circuit structure information at a desired location of a desired program to the initial value/expected value file 112 of the object program will be explained with reference to FIG. 3.

At step 300, when the operator has started the instruction interpreter 102, the instruction interpreter 102 clears the logic circuit structure information of the register, memory, cache and TLB in the instruction interpreter 102. At step 301, the assigned program is loaded from the file to the memory within the instruction interpreter 102.

At step 302, when the operator has assigned a desired address of the loaded program, the instruction interpreter 102 saves the value of the address of the program and the operation code of the instruction at this address. At step 303, an interruption generating instruction or a corresponding code is inserted in this address.

At step 304 for making a decision of whether there is an address assignment or not, the assignment of a desired address of the program and saving of this address and the instruction of the address at the step 302 and the insertion of the interruption generating instruction at the step 303 are repeatedly carried out for addresses within the program. When there is no address assignment, the program is executed at step 305.

At the step 305, the instruction interpreter 102 executes the instructions until an interruption occurs in the assigned address.

At step 306 a decision is made whether an interruption has occurred or not. If an interruption has occurred, at step 307, the contents of the register, cache, memory, and TLB are registered in the initial value/expected value file 112 of the object program. If an interruption has not occurred, the registration of these values in the file is finished.

At the step 307, the instruction interpreter 102 registers the logic circuit structure information that is being held, in the initial value/expected value file 112 of the object program. At step 308, the instruction saved in advance is executed.

At the time of registering the logic circuit structure information in the initial value/expected value file 112 of the object program, the operator can freely correct or alter necessary information by the instruction interpreter (a correcting or altering unit) 102 in order to test an executable portion of the program.

At step 309 for making a decision of whether the execution is to be continued or not, the steps 301 to 308 are repeated when a decision has been made to continue the execution, so that the instruction interpreter 102 outputs the logic circuit structure information at a desired location of a desired program as an initial value or as an expected value to the initial value/expected value file 112 of the object program. When a decision has been made not to continue the execution, the processing is finished.

In the process as described above, the instruction interpreter 102 outputs the logic circuit structure information at a desired location of a desired program to the initial value/expected value file 112 of the object program.

Figure 4:
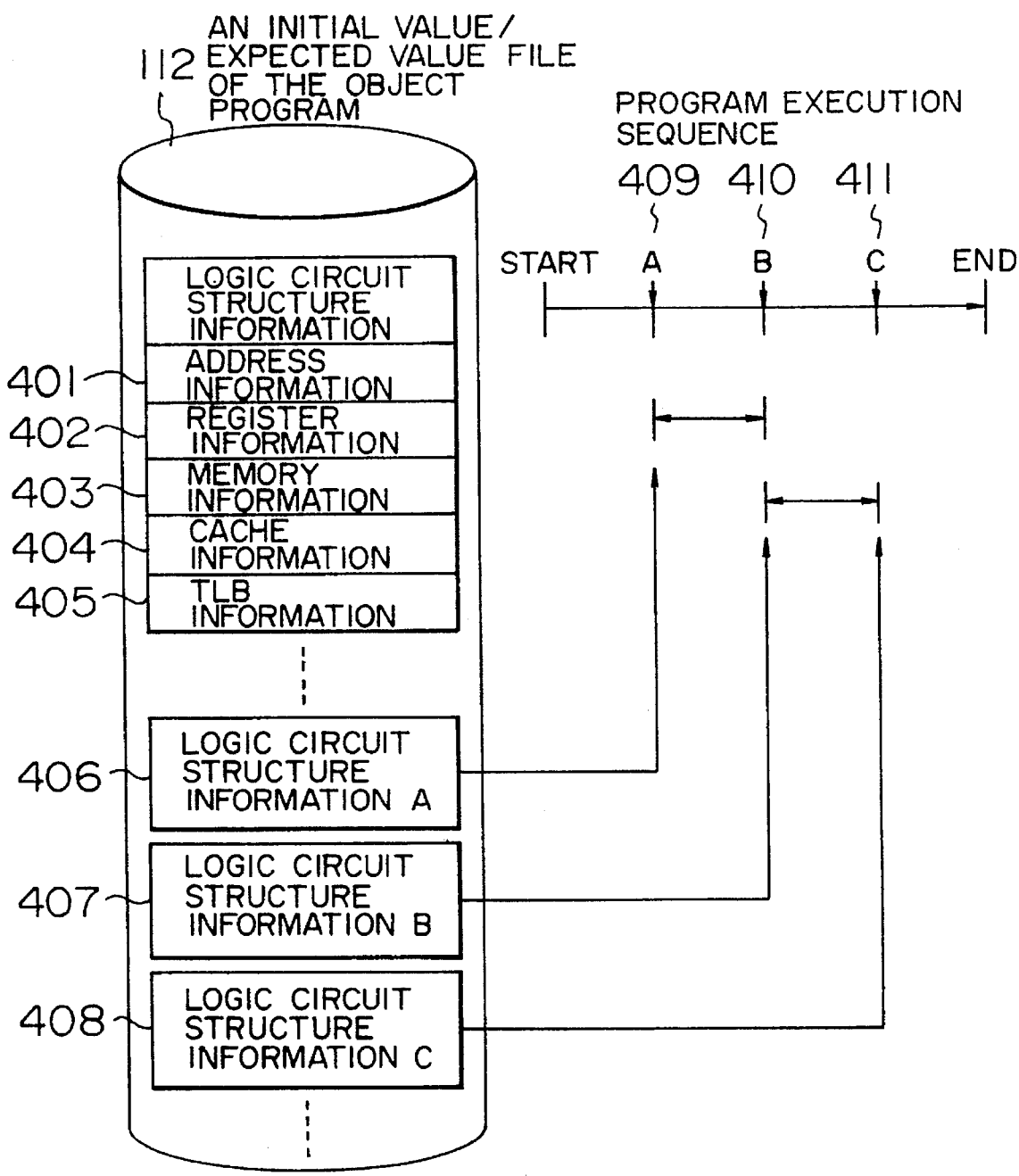
FIG. 4 is an outline explanation diagram for showing one example of the format of the initial value/expected value file of the object program and the method for using this file in the present embodiment.

Next, the format of the initial value/expected value file 112 and the method for using this file will be explained with reference to FIG. 4. The initial value/ expected value file 112 of the object program includes sets of logic circuit structure information such as, for example, address information 401, register information 402, memory information 403, cache information 404 and TLB information 405. In the present embodiment, the method for using the initial value/expected value file 112 of the object program will be explained on the assumption that three sets of information are stored in the initial value/expected value file 112 of the object program and that these three sets of information are logic circuit structure information at three desired locations of a desired program, that is, A location 409, B location 410 and C location 411 to which the instruction interpreter 102 has executed the program respectively.

In the case of executing a program from the A location 409 to the B location 410 by the data processing unit 105 or the logic circuit model 106, for example, logic circuit structure information A406 which is the information of the A location 409 is used as an initial value of the processing unit 105 or the model 106 and logic circuit structure information B407 which is the information at the B location 410 is used as an expected value of the result of the execution by the unit 105 or the model 106.

Similarly, in the case of executing from the B location 410 to the C location 411 by the unit 105 or the logic circuit model 106, logic circuit structure information A407 which is the information of the B location 410 is used as an initial value of the unit 105 or the model 106 and logic circuit structure information B408 which is the information at the C location 411 is used as an expected value of the result of the execution by the unit 105 or the model 106.

With the above arrangement, it becomes possible to read the logic circuit structure information at the A, B and C locations from the initial value/expected value file 112 of the object program and set the information as the initial value and expected value of the program to be executed, so that the logic circuit can be verified.

As described above, according to the logic verification apparatus of the present embodiment, it is possible to execute only a desired section of a desired program on the data processing unit to be tested 105 or the logic circuit model 106, by using the instruction interpreter 102 for registering the logic circuit structure information at a desired location of a desired program, or the service processor 103 for setting an initial value and an expected value at the time of executing the program, or the data setting unit 104. Thus, it is possible to efficiently execute a wider range of logic verification in higher precision without being constrained by the execution environment as compared with the conventional method or system.

Although the above explains in detail the invention made by the present inventor based on the embodiment, it is needless to mention that the present invention is not limited to the above embodiment and it is also possible to modify, the present invention in various ways within the range of the scope of the present invention.

In the above embodiment, an interruption generating instruction is inserted and by the generation of an interruption, the initial value/expected value file 112 of the object program is generated. However, when the operator has assigned a desired address of the program which has been loaded, it is also possible to widely apply a method that the instruction interpreter 102 saves the address of the program, executes the program to this address and registers the logic circuit structure information held at the time of the completion of the execution in the initial value/expected value file 112 of the object program.

Further, as another method for registering in the initial value/expected value file 112 of the object program, when the operator has assigned a number of steps, it is also possible to widely apply an instruction counting system that the instruction interpreter 102 saves the number of steps, executes the instruction by the assigned number of steps and registers the logic circuit structure information held at the time of the completion of the execution in the initial value/ expected value file 112 of the object program.

Further, in carrying out logic verification, it is also possible to use an exclusive logic simulator or FPGA (field programmable gate array) which is a logic circuit, or the like, to execute logic verification of the portions other than the logic verification instruction sequence of the program. In this case, logic verification can be carried out at a high speed.

We claim:

1. A logic verification method for simulating a logic circuit model by using an instruction interpreter, connected to first and second files, for executing an executable program, comprising the steps of:

outputting from said instruction interpreter to said second file first status information, including data information and address information in said instruction interpreter, after a time when an executable program loaded from said first file has been executed and stopped at a first inputted address location in said instruction interpreter;

outputting from said instruction interpreter to said second file second status information, including data information and address information stored in said instruction interpreter, after another time when an executable program loaded from said first file has been executed and stopped at a second inputted address location in said instruction interpreter;

setting said first status information in memory means of said logic circuit model; and outputting to a display, together with said second status information, third status information, including data information and address information in said logic circuit model, after another time when said executable program has been executed from said first address location and stopped at said second address location in said logic circuit model.

2. A logic verification method according to claim 1, further comprising the step of:

comparing said third Status information with said second status information and outputting to said display a message for showing a simulation error when said third status information is different from said second status information.

3. A logic verification method according to claim 2, further comprising the steps of:

saving an instruction at said first address location of said executable program to be executed in said instruction interpreter and setting a specific code in place of said instruction; and executing said saved instruction after said step of setting said first status information in Said memory means of said logic circuit model.

4. A logic verification method according to claim 3, further comprising the step of:

outputting said first status information to said display to assist in altering said first status information.

5. A logic verification method according to claim 2, further comprising the step of:

outputting said first status information to said display to assist in altering said first status information.

6. A logic verification method according to claim 1, further comprising the steps of:

saving an instruction at said first address location of said executable program to be executed in said instruction interpreter and setting a specific code in place of said instruction; and executing said saved instruction after said step of setting said first status information in memory means of said logic circuit model.

7. A logic verification method according to claim 6, further comprising the steps of:

comparing said third Status information with said second status information and outputting to said display a message for showing a simulation error when said third status information is different from said second status information; and outputting said first status information to said display to assist in altering said first status information when said message for showing said simulation error has been outputted to said display.

8. A logic verification apparatus for simulating a logic circuit model by using an instruction interpreter, comprising:

a first file for holding a plurality of executable programs;

a second file for holding status information;

an instruction interpreter, connected to said first and second files, and having a memory for storing at least one of said plurality of executable programs and status information to be used for the execution of said at least one program, for executing said at least one program; and a control unit connected to the instruction interpreter for controlling execution of a program by said instruction interpreter;

wherein said instruction interpreter outputs to said second file first status information after said at least one program has been executed to a first address location inputted through said control unit, and outputs to said second file second status information after said at least one program has been executed to a second address location which follows said first location;

said verification apparatus further including:

a logic circuit model, connected to said control unit, for loading thereinto said at least one program and said status information to be used for the execution of said at least one program;

data setting units, connected between said logic circuit model and said control unit, for setting said first status information held in said second file to said memory of said logic circuit model;

wherein said control unit outputs to said second file third status information after said at least one program has been executed to said first address location in said logic circuit model; and said verification unit further having a display for displaying both said second status information and said third status information.

9. A logic verification apparatus according to claim 8, further comprising:

comparing means, connected to said logic circuit model and said second file, for comparing said second status information with said third status information and displaying an error message to said display when said second status information and said third status information are mutually different.

10. A logic verification method for a logic circuit model expressed by a combination of gate logic elements, comprising the steps of:

registering a group of logic circuit structure information at a plurality of desired address locations in a desired program to be executed on an instruction interpreter for simulating an operation equivalent to said logic circuit model;

setting a value of said group of logic circuit structure information to a memory within said logic circuit model as an initial value at one of said plurality of desired address locations when said program is executed and setting said value as an expected value when said program has been executed to another address location of said plurality of desired address locations;

executing a section from said one address location to said another address location of said program in said logic circuit model; and making a decision of whether the result of said execution is correct or not based on said logic circuit structure information.

11. A logic verification method according to claim 10, further comprising the step of:

altering said group of logic circuit structure information at a desired location when registering said logic circuit structure information.

12. A logic verification method according to claim 10, wherein, for a portion of the program other than the section executed from said one address location to said another address location, logic verification is carried out by using an exclusive logic simulator or an exclusive logic circuit.

13. A logic verification method according to claim 10, further comprising the steps of:

saving instructions corresponding to a plurality of desired address locations of a desired program to be executed on said instruction interpreter and generating an interruption place of said saved instructions;

starting said program for detecting an interruption at said plurality of address locations; and holding said logic circuit structure information in said file when said interruption has been detected, recovering said saved instruction and executing said program.

14. A logic verification method for simulating a logic circuit model by using an instruction interpreter, connected to first and second files, for executing an executable program comprising the steps of:

executing an executable program loaded from said first file and stopping said executable program at a first inputted address location in said instruction interpreter;

outputting first status information, including data information and address information in said instruction interpreter, from said instruction interpreter to said second file;

executing an executable program loaded from said first file and stopping said executable program at a second inputted address location in said instruction interpreter;

outputting second status information including data information and address information, in said instruction interpreter, from said instruction interpreter to said second file;

setting said first status information in memory means of said logic circuit model;

executing an executable program loaded from said first file from said first address location to said second address location in said logic circuit mode; and outputting third status information, including data information and address information, in said logic circuit model together with said second status information to a display.

* * * * *